United States Patent
Dreixler et al.

(10) Patent No.: US 9,482,315 B1
(45) Date of Patent: Nov. 1, 2016

(54) STUD END LINK

(71) Applicant: Columbia Steel Casting Co., Inc., Portland, OR (US)

(72) Inventors: Charles Dreixler, Canby, OR (US); B. Anthony Miotke, Sublimity, OR (US); David Garnet John Conroy, Mackay (AU)

(73) Assignee: Columbia Steel Casting Co., Inc., Portland, OR (US)

( * ) Notice: Subject to any disclaimer, the term of this patent is extended or adjusted under 35 U.S.C. 154(b) by 0 days.

(21) Appl. No.: 14/882,702

(22) Filed: Oct. 14, 2015

(51) Int. Cl.
*F16G 13/18* (2006.01)
*F16G 13/10* (2006.01)
*E02F 3/58* (2006.01)
*F16G 13/12* (2006.01)

(52) U.S. Cl.
CPC ............... *F16G 13/18* (2013.01); *E02F 3/58* (2013.01); *F16G 13/10* (2013.01); *F16G 13/12* (2013.01)

(58) Field of Classification Search
CPC ........ F16G 13/10; F16G 13/12; F16G 13/18; E02F 3/58
USPC .......................................................... 59/95
See application file for complete search history.

(56) References Cited

U.S. PATENT DOCUMENTS

| | | | |
|---|---|---|---|
| 2,066,852 A | 1/1937 | Plummer | |
| 2,201,352 A * | 5/1940 | Skoverski | F16G 15/08 59/95 |
| 3,757,959 A | 9/1973 | Thompson et al. | |
| 5,399,042 A * | 3/1995 | Ivel | E21B 7/28 403/165 |
| 6,170,248 B1 | 1/2001 | Ianello et al. | |
| 6,871,486 B2 | 3/2005 | Moehnke et al. | |
| 7,086,951 B2 * | 8/2006 | Chang | F41B 15/00 463/47.5 |
| 7,743,597 B2 * | 6/2010 | Shnayder | B63B 21/04 24/3.4 |
| 2012/0102679 A1 | 5/2012 | Doan et al. | |
| 2013/0133175 A1 | 5/2013 | Doan et al. | |

FOREIGN PATENT DOCUMENTS

| | | |
|---|---|---|
| EP | 1490278 B1 | 9/2010 |
| EP | 2805899 A1 | 11/2014 |

* cited by examiner

*Primary Examiner* — David B Jones
(74) *Attorney, Agent, or Firm* — Klarquist Sparkman, LLP

(57) ABSTRACT

A stud end link comprises a main body having first and second openings and a swivel ball bushing. The first opening and swivel ball each have truncated spherical surfaces to allow the swivel ball to be seated within the first opening, while permitting the swivel ball to pivot a limited amount about a lateral axis within the first opening. The first opening includes a slot to facilitate installation and removal of the swivel ball. In some implementations, the swivel ball includes a tab which matingly fits within the slot to prevent rotation of the swivel ball about an axis perpendicular to the main body.

20 Claims, 10 Drawing Sheets

STUD END LINK

FIELD

The present invention pertains to chains and chain links in general and more specifically to large chains and chain links adapted for use with heavy equipment.

BACKGROUND

Many forms of heavy equipment require chains which have very large load hoisting, or lifting, capabilities. One such field of use for heavy lifting chains is in draglines which are commonly used for removing large volumes of material, such as dirt, loosened ore, etc. Draglines work by dragging a large bucket along the surface to scoop up material and are available in a variety of sizes.

Heavy equipment, in the form of draglines, are some of the most massive mobile equipment produced, with the largest having capacities in excess of 100 cubic yards per bucket load.

The loads on the hoist and drag chains and their links are massive. These loads require the use of specialized chain links made from high strength alloy steels. In addition, these chains and chain links must be designed to endure a tremendous amount of wear. For example, one common failure point for links having a bushing welded thereto to provide a wear surface at the coupling point for adjacent links is the weld.

The structure and operation of a typical dragline requiring such massive and high load carrying chains and links is described in U.S. Pat. No. 6,170,248 which is incorporated herein by reference.

It would be advantageous to provide chain links for heavy equipment, including but not limited to draglines, which are capable of withstanding the high loads imposed thereon, have longer life cycles, and are less prone to failure.

SUMMARY

Described below is a new end link for use in heavy equipment. In one implementation, the end link includes a main body having first and second openings and a swivel ball seated within the first opening. The first opening includes a slot at one end. The swivel ball has a bore suitable for receiving a mating pin and a truncated substantially spherical outer surface. The first opening has a complementary truncated substantially spherical inner wall to receive the swivel ball, thereby allowing the swivel ball to pivot through a limited range of motion out of the plane of the main body.

The swivel ball in one implementation is free to pivot about a lateral axis up to about 3 degrees out of alignment with the main body.

Also described is a method for installing the swivel ball. The swivel ball may be oriented perpendicularly to the main body and inserted into the first opening and slot. The swivel ball then is moved longitudinally away from the slot and rotated about a longitudinal axis to seat the swivel ball in the first opening. As seated, the swivel ball is constrained from moving longitudinally or laterally within the first opening, is permitted to pivot or tilt a limited amount about a lateral axis passing through the swivel ball, and yet is free to rotate largely without restriction about a longitudinal axis for installation and removal.

The swivel ball may have a thickness that is less than the width dimension of the slot so that the swivel ball may be oriented perpendicularly to the main body and inserted sideways into the first opening and slot.

In another implementation, the swivel ball has a tab at one end which aligns with and is matingly received within the slot. When the swivel ball is seated within the first opening, the tab prevents the swivel ball from rotating within the first opening about an axis perpendicular to the main body.

In another implementation, the tab and slot have mating truncated substantially spherical surfaces to allow the swivel ball to pivot a limited amount about a lateral axis relative to the main body.

The foregoing and other objects, features, and advantages of the invention will become more apparent from the following detailed description, which proceeds with reference to the accompanying figures.

DETAILED DESCRIPTION

Figure 1:
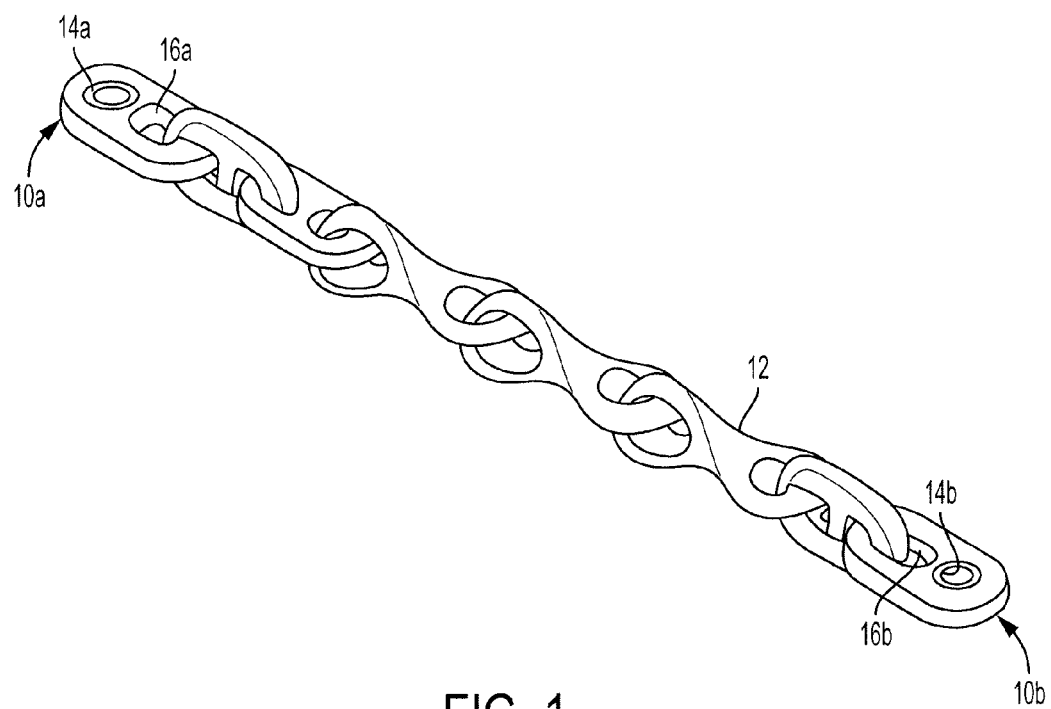
FIG. 1 is a perspective view of a prior art chain having end links.

Referring to FIG. 1, a conventional drag chain used in dragline equipment is shown having a pair of stud end links 10a, 10b, connected by a plurality of chain links 12 therebetween. Each stud end link includes a pass-through bore or opening at one end to receive a bushing 14a, 14b, welded thereto, and a link bore or opening 16a, 16b at the other end to receive one of the chain links 12.

Each bushing 14a, 14b is a conventional cylindrical bushing that is matingly received within a bore opening sized to fit the bushing and welded in place. A significant problem with the stud end link or end link as just described is that it is prone to failing at the weld, requiring the bushing and/or stud end link to be replaced. The wear life of the stud end link is shortened when the weld fails.

Figure 2:
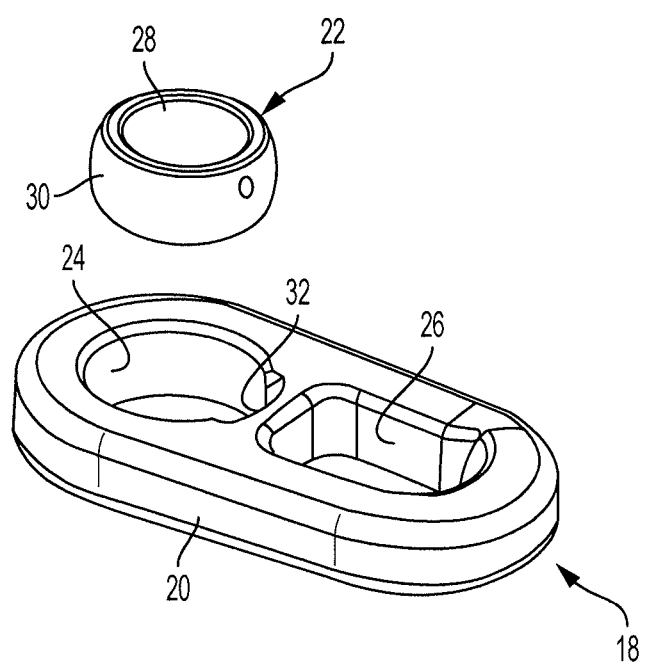
FIG. 2 is an exploded perspective view of an embodiment of a stud end link.

Referring to FIG. 2, an improved stud end link (or end link) 18 includes a main body 20, swivel ball bushing (or swivel ball) 22, truncated substantially spherical mating surface (or pass-through opening) 24 located at one end of the main body, and link opening (or pass-through opening)

26 located at the other end of the main body. The main body 20 preferably has a generally oblong-like shape, with rounded corners and mildly tapering sides, but other shapes compatible with chain links or end links are suitable as well. The swivel ball 22 includes a pin bore 28 adapted to receive a matingly sized pin (not shown) or other cylindrical through-member, and a truncated substantially spherical outer surface (or wall) 30. The inner surface of the pin bore preferably is substantially cylindrical. The radius of the spherical outer surface 30 generally corresponds to the radius of the spherical mating surface 24 to provide a compatible fit. In reference to outer surface 30 and mating surface 24, the term "truncated substantially spherical surface" is meant to refer to a surface that is generally curvilinear in two directions and generally corresponds to a partial surface portion of a sphere (such as a surface portion comprising a 360 degree band around an equator of the sphere). At one end of the mating surface 24 a channel or slot 32 is formed in the main body proximate to both a central region of the main body and one end of the link bore 26. The width of the slot is at least slightly greater than the swivel ball's thickness.

The link opening 26 preferably is an elongated opening with tapering sides corresponding to the tapering sides of the main body 20. The link opening serves to receive and capture an adjacent chain link, as illustrated in FIG. 1.

The stud end link 18 (and main body 20) can be described with respect to a coordinate axis system. While the end link (and main body) can have many shapes, forms and proportions, it preferably is longer than it is wide and has a thickness that is less than its length and width. Due to its preferably quasi-flat profile, the main body 20 can be said to define a main body plane extending therethrough that bisects the main body into upper and lower halves. The main body plane is co-planar with the main body. A longitudinal center axis lying in the plane extends the length of the link and bisects the main body into two preferably generally symmetric or mirror image lateral halves. The longitudinal center axis also bisects the openings 24 and 26, preferably into two symmetric halves. A lateral axis perpendicular to the longitudinal center axis also lies in the plane and passes through the geometric center of the pass-through mating surface or opening 24. A perpendicular axis passes perpendicularly through the plane (defined by the longitudinal and lateral axes) and through the midpoint where the longitudinal and lateral axes intersect, providing a 3-axis coordinate system whose center is at the geometric center opening 24. A lateral center axis parallel to aforementioned center axis divides the main body laterally into two asymmetric halves.

Figure 3:
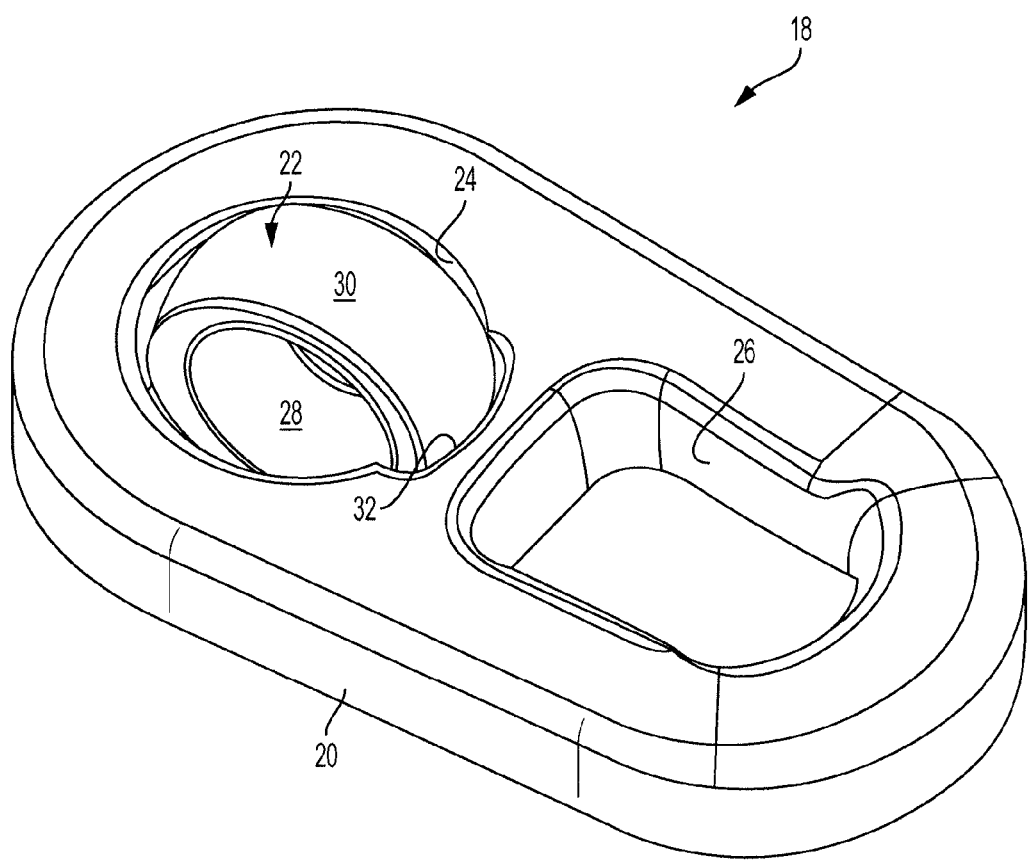
FIG. 3 is a perspective view of the stud end link as a swivel ball bushing is installed.

Turning to FIG. 3, the swivel ball 22 is installed in the stud end link by aligning the swivel ball at a 90 degree (sideways) orientation to the main body 20, inserting the swivel ball into the spherical mating surface 24 and slot 32, moving the swivel ball away from the slot in a longitudinal direction and into contact with the mating surface 24, and then rotating the swivel ball about the longitudinal center axis.

Figure 4:
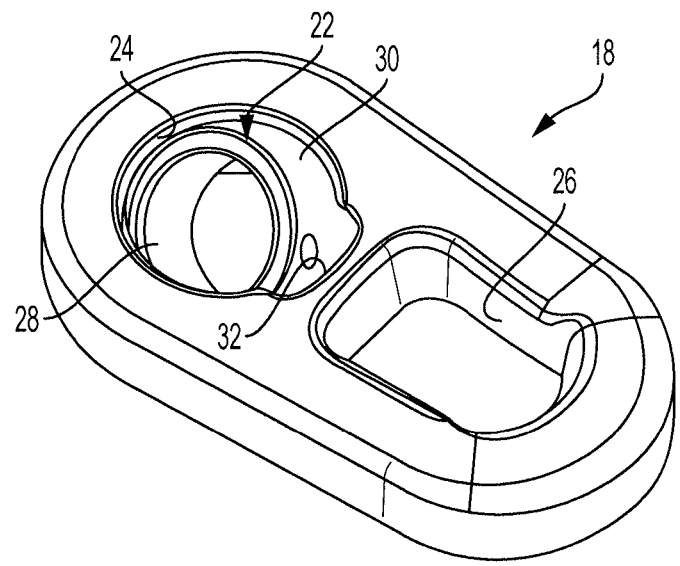
FIG. 4 is another perspective view of the stud end link as the swivel ball bushing is installed.

FIG. 4 shows the swivel ball being partially rotated (about 45 degrees) within the mating surface 24.

Figure 5:
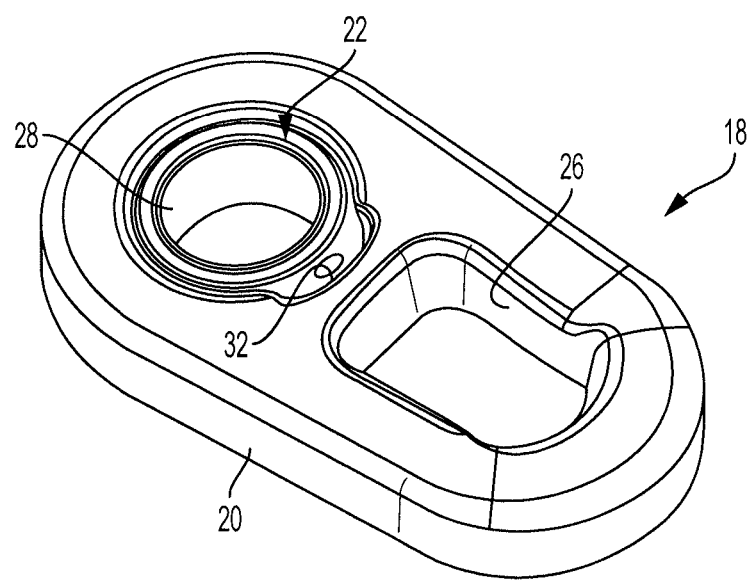
FIG. 5 is a perspective view of the stud end link with the swivel ball bushing installed.

FIG. 5 shows the swivel ball fully rotated (90 degrees) and seated within the mating surface 24 of the stud end link. As so seated, the spherical outer surface 30 of the swivel ball and spherical mating surface 24 are in mating or nesting contact with one another. As the swivel ball is installed, the center axis of the pinhole 28 rotates 90 degrees from a position substantially co-planer with the main body plane (and substantially parallel to the lateral axis) to a position perpendicular to the plane (and at least largely coextensive with the perpendicular axis).

Due to the geometry of the truncated spherical engaging surfaces, the swivel ball is captured by the main body 20 and largely restrained from moving relative to the main body, either longitudinally, laterally or perpendicularly, except to the limited extent described below. The swivel ball, which may also be referred to as a swivel ball bushing, is captured in place without any welding.

In operation, the stud end link is subject to large forces acting primarily in the direction of the longitudinal axis of the main body. The mating surface 24 of the main body provides a wall surface to support the lateral sides of the swivel ball and, because the mating surface engages the swivel ball largely on all sides, also supports the longitudinal sides of the swivel ball as well. The swivel ball as a whole also is prevented from being displaced perpendicularly (except in the limited pivoting manner described below). In other words, the swivel ball is constrained from translation movement in the longitudinal, lateral and perpendicular directions. (Any displacement perpendicularly "out of plane" is through pivoting movement.) Yet, the spherical surface interengagement of the swivel ball 22 and mating surface 24 allows the main body to tilt or pivot a limited amount "out of plane" relative to the swivel ball as, for example, up to about 3 degrees off-axis (including up to about 1 degree and up to about 2 degrees off-axis) to accommodate off-axis loads. Depending on perspective it also can be said that the swivel ball is free to swing or tilt "out of plane" relative to the main body up to about 3 degrees off-axis (including up to about 1 degree and up to about 2 degrees off-axis) to accommodate off-axis loads. Such tilting displacement occurs when the swivel ball pivots about the lateral axis (which laterally bisects the swivel ball pin hole 28) such that a distal end of the swivel ball pivots out of plane in one direction and the other proximal end (near the slot) pivots out of plane in the other direction.

At the same time, if the swivel ball becomes worn or otherwise needs to be replaced, the swivel ball can be easily removed from the stud end link by rotating the swivel ball 90 degrees about the longitudinal center axis, shifting it in the direction of the slot 32, and moving it in a direction perpendicular to the plane of the main body, thereby reversing the installation process. As the swivel ball is not welded in place, it is free to rotate or spin within the main body plane about the perpendicular axis (i.e., relative to the mating surface 24a).

The stud end link is used in coupling or attaching a variety of rigging components to one another, such as hitch extensions, spreader bars, upper/lower hoist chains, drag rope sockets, bucket hitches and the like. The stud end link generally would not be used as a regular intermediary link in a drag chain or other chain.

The main body 20 of the end link and swivel ball 22 may be made of a variety of materials suitable for chains and chain links used in draglines and heavy equipment environments including but not limited to high strength low alloy steel (HSLA). As one example, the swivel ball may be made of manganese steel. The dimensions of the end link and swivel ball may vary widely in the context of draglines and heavy equipment, high load use. By way of example, one embodiment of the swivel ball may have an outer diameter up to about 18 inches, an inner diameter (pin hole) up to about 12.25 inches and a length up to about 46 inches.

It will be appreciated that the main body 20 and opening 26 can take many different forms and shapes in this embodiment and embodiments discussed later. For example, in some embodiments the body 26 can have converging or parallel sides. If the sides converge toward one another, the link opening 26 can be located on the wide end or narrow end of the main body 20, with the swivel ball 22 located on the other end. The link opening 26 preferably is rounded at its distal end and straight at its opposed proximal end (proximate the central area of the main body) as shown in FIGS. 3-5, but the link opening also can be rounded at both ends.

By way of further example, the main body typically as a length of about 10 inches to about 46 inches (including about 12 to 38 inches), a width at its widest point of about 3 to about 14 inches (including about 4 to 12 inches), and a thickness of about 1.5 inches to about 9 inches (including about 3 to 7 inches).

By way of example, the pin bore 28 of the swivel ball typically has a diameter of about 2 inches to about 10 inches, such as about 3 to 8 inches. The thickness of the swivel ball typically is slightly greater than the thickness of the main body 20.

Figure 6:
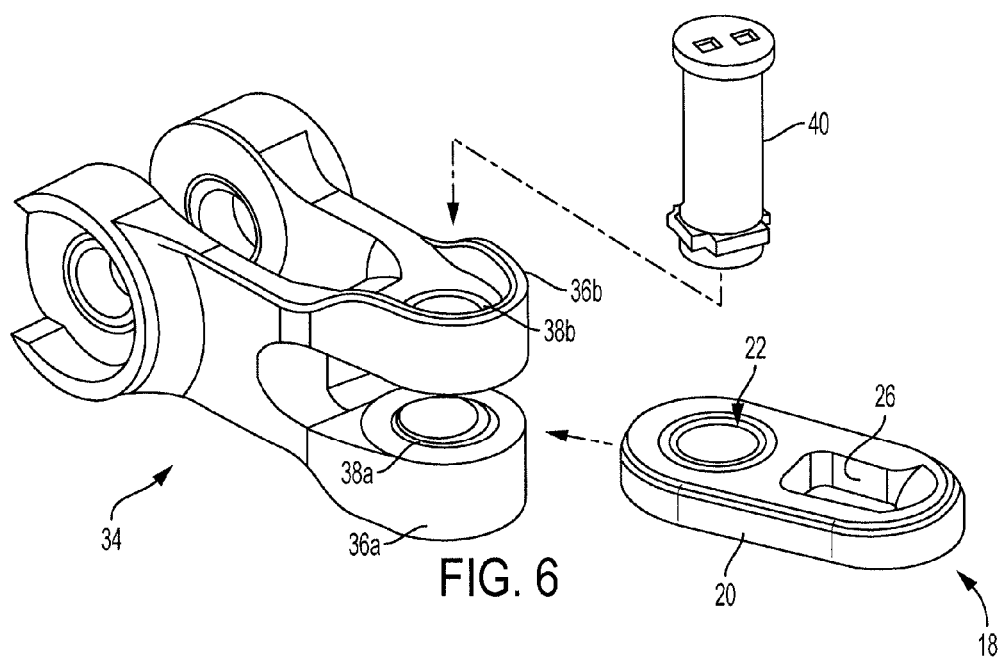
FIG. 6 is an exploded view illustrating one type of rigging to which the stud end link may be connected.

FIG. 6 illustrates how the stud end link may be coupled to a trunion 34 having bracket legs 36a, 36b and corresponding bushings 38a, 38b seated therein. The stud end link 18 is coupled to the trunion 34 by moving the swivel ball 22 into alignment with the bushings 38a, 38b and locking the components in place by inserting a mating pin 40 through the aligned bores of the bushings 38a, 38b and pin hole of the swivel ball 22.

Figure 7:
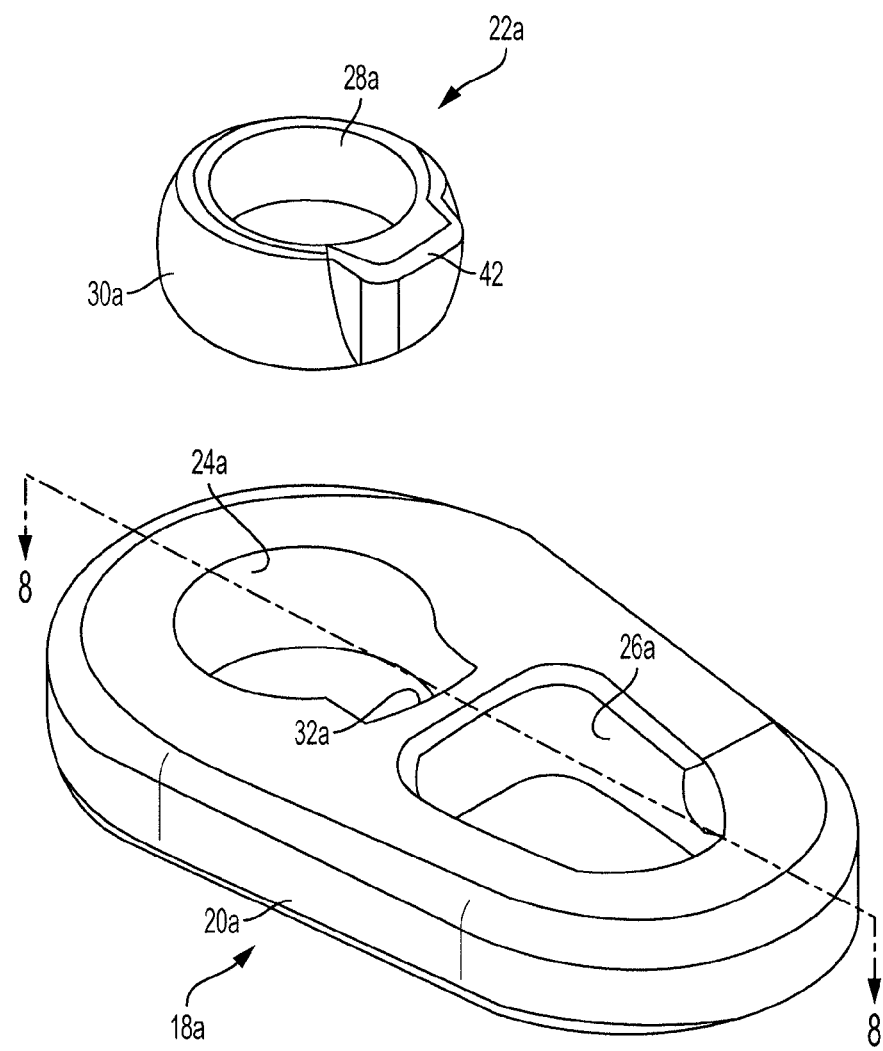
FIG. 7 is an exploded perspective view of a second embodiment of a stud end link, including a swivel ball bushing.

A second embodiment of the stud end link is shown in FIGS. 7-11. Referring to FIG. 7, a stud end link 18a includes a main body 20a, swivel ball bushing or swivel ball 22a, truncated substantially spherical mating surface (or opening) 24a, and link opening 26a, as previously described. The general shape, form, material, dimensions and other characteristics of the stud link 18a correspond to the end link 18, except where noted. For example, the swivel ball 22a likewise has a pin bore 28a and truncated substantially spherical outer surface 30a. A channel or slot 32a also is provided on the proximal side of the mating surface 24a and centered on the longitudinal axis of the main body 28a, as described previously.

Unlike the swivel ball 22, the swivel ball 22a is provided with a locking tab 42 on the slot side of the spherical outer surface 30a. The tab 42 aligns with the slot 32a and preferably is bisected by the longitudinal axis of the main body. The tab 42 preferably is symmetric relative to the longitudinal axis (as is mating surface 24a). As shown in the longitudinal cross section views of FIGS. 8, 9, however, the tab 42 preferably is not symmetric in the perpendicular direction. In other words, the tab is not symmetric relative to the main body plane. The thickness of the tab tapers and becomes thinner moving perpendicularly from one surface (e.g., top surface) of the main body to the other surface (e.g., lower surface). The outer surface of the tab 42 is curvilinear in two directions to form a truncated substantially spherical surface. Similarly, the slot 32a presents a reverse mirror image, and has a truncated substantially spherical surface that mates or nests with the locking tab 42. Thus, the slot 32 is symmetric relative to the longitudinal axis but asymmetric relative to the perpendicular axis.

Figure 8:
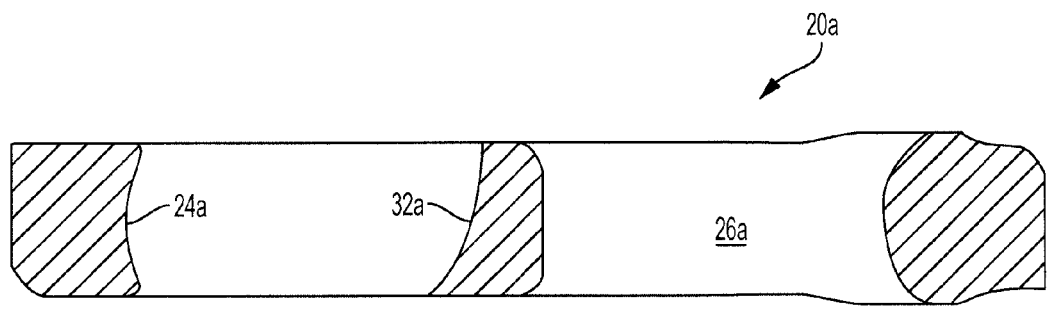
FIG. 8 is a longitudinal cross section view taken along line 8-8 of FIG. 7.
Figure 9:
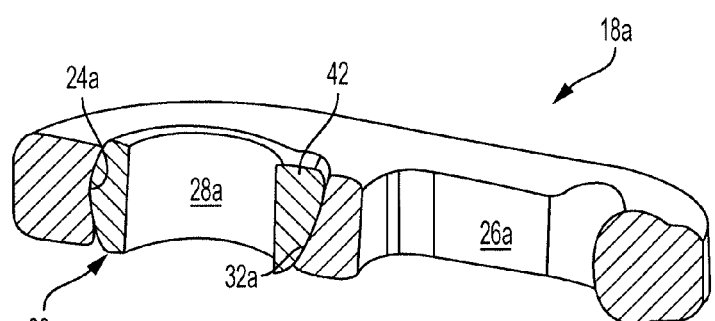
FIG. 9 is a longitudinal cross section view of the stud end link of FIG. 8, with the swivel ball bushing installed, and viewed from a perspective above and to one side of the link.

As FIGS. 7, 8 and 9 illustrate, the slot 32a is curvilinear in the perpendicular and lateral directions and has a taper. Unlike the tab 42, however, the thickness of the slot wall is thinnest at the top surface of the main body and gets thicker moving toward the bottom surface, thereby providing a mating fit with the tab 42. Put another way, the depth of the slot is greatest at the top surface and smallest at the bottom surface. The mating truncated spherical geometries of the tab and slot, as well as the mating geometries of the rest of the swivel ball's outer surface 30 and mating surface 24a, allow the swivel ball to tilt or pivot relative to the main body outside the plane of the main body, as explained further below. Yet, the swivel ball is constrained by the locking tab from rotating or spinning within the mating surface 24a (i.e., within the plane of the main body), unlike the embodiment described above.

Stated differently, the swivel ball and main body have several paths of possible relative movement. Within the plane of the main body, the swivel ball (once installed) is absolutely constrained from translation movement both longitudinally or laterally, and from spinning or rotating about a perpendicular axis of rotation passing through the center of the swivel ball's pin bore 28a. The swivel ball, however, can tilt or pivot a limited amount about a lateral pivot axis passing through the midpoint of the swivel ball's pin hole, as described above. And the swivel ball can pivot or rotate at least 90 degrees about a longitudinal axis passing through the center of the swivel ball (as well as the tab) to facilitate installation and removal of the swivel ball.

Figure 10:
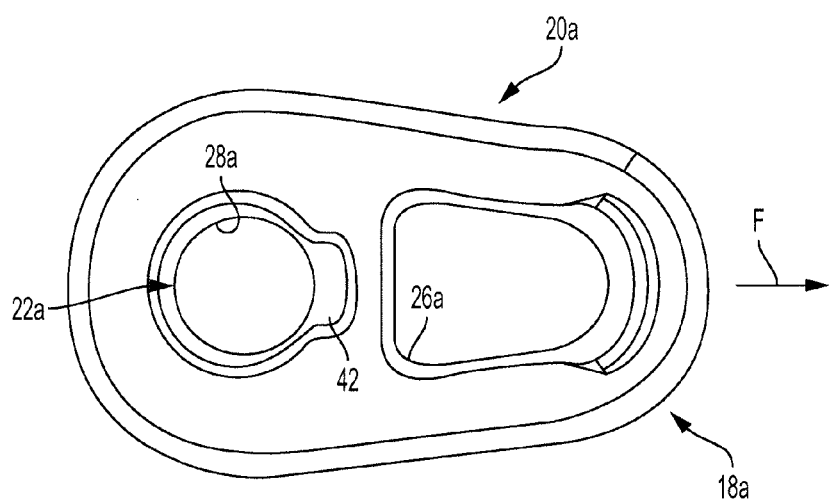
FIG. 10 is a top plan view of the stud end link of FIGS. 7-9.

Referring to FIG. 10, the swivel ball 22a preferably is eccentric for a second reason other than the tab's location at one end. The wall thickness of the swivel ball at the distal end is thicker and tapers as it approaches the tab 42. In other words, the wall thickness of the swivel ball is thinnest in the areas on either side of the tab 42 and thickest at the opposite distal, longitudinally-opposed end.

Explained in a different way (and ignoring the tab 42 for illustration), the additional material on the distal end of the swivel ball is created by shifting the swivel ball's bore (or pin hole) a certain distance, preferably about ¼ inch to ¾ inch, in the direction of the slot, such that the swivel ball is slightly eccentric. In other words, the center axis defined by the cylindrical pinhole 28a is displaced about ¼ inch to ¾ inch relative to the center axis of the outer surface 30a. The pinhole 28a and outer surface 30a have center axes that are displaced and not coincident.

Most of the force exerted on the stud end link by the dragline is applied in the pull direction of arrow F shown in FIG. 10, and results in substantial loading and maximum wear on the longitudinal distal side of the swivel ball 22a. The eccentric swivel ball, with additional material on the high wear side of the swivel ball, facilitates additional service life during operation.

Figure 11:
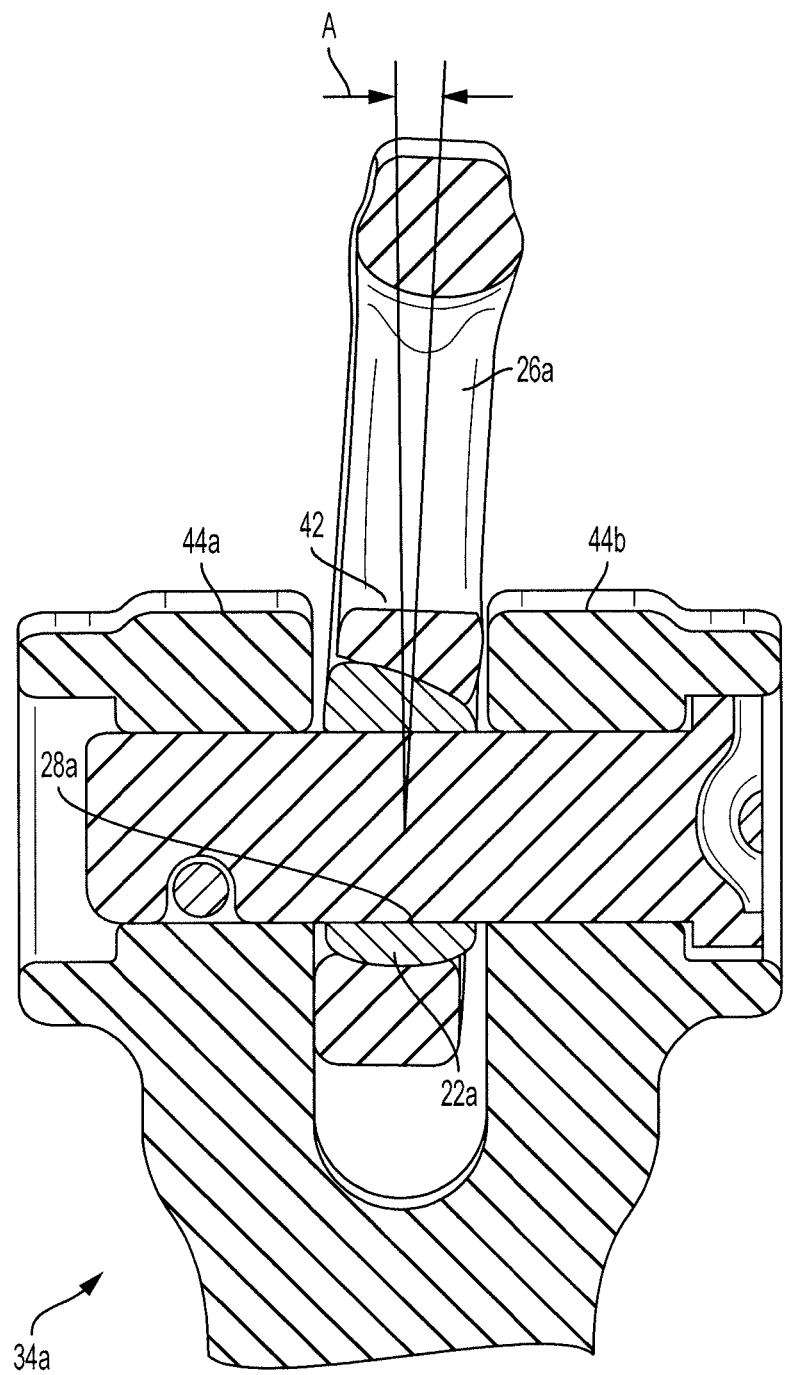
FIG. 11 is a cross sectional view of the stud end link coupled to one end of a trunion by a pin.

Referring to FIG. 11, the main body 20a of the end stud link is shown attached to a trunion 34a having a mating pin 40a and bracket legs 44a, 44b, each of which seats a bushing. The end stud link is located between the bracket legs 44a, 44b and captured in place by the mating pin 40a, which extends through the pin bore 28a of the swivel ball 22a. Due to the truncated spherical connection between the swivel ball 22a and main body 20a, the main body is able to pivot or swing in the perpendicular direction a distance, preferably up to about 1½ degrees on each side of vertical, for a total pivot angle or swing angle A of up to about 3 degrees (including up to about 2 degrees and up to about 1 degree). Notably, the pin 40a and swivel ball 22a mounted thereto remain fixed, and the main body 20a of the end chain link pivots or swings relative thereto to accommodate off axis loading.

Figure 12:
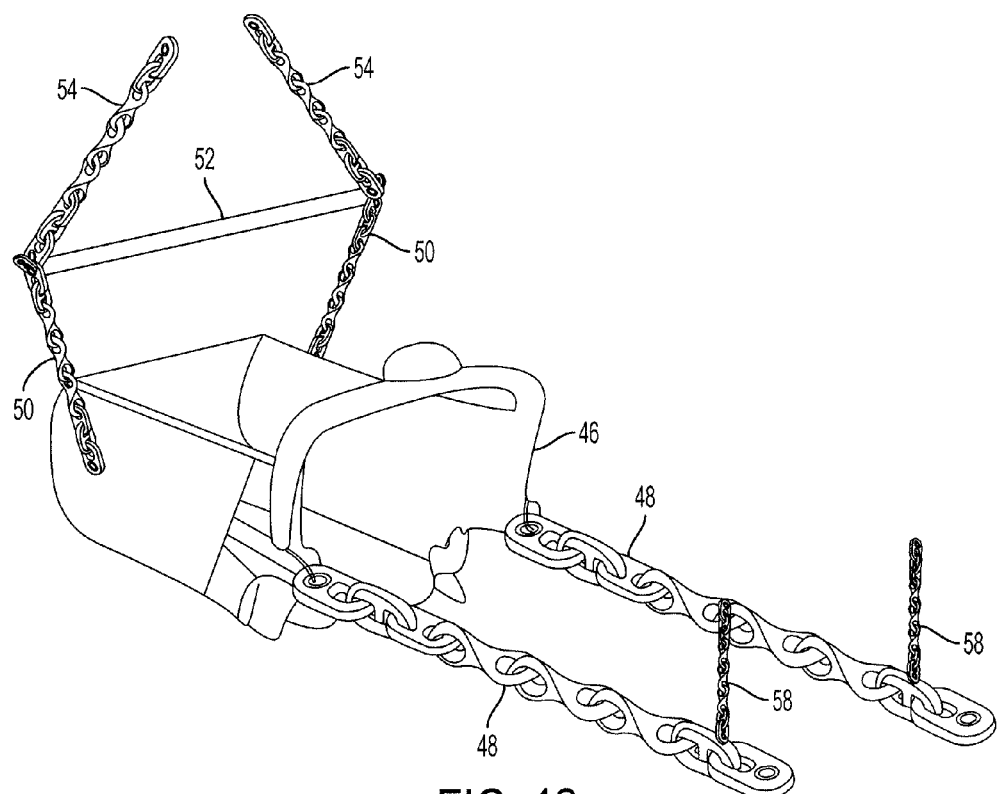
FIG. 12 is a perspective view of a typical dragline.

FIG. 12 is a perspective view of a conventional dragline bucket 46, pair of dragline chains 48, pair of lower hoist chains 50, spreader bar 52, pair of upper hoist chains 54, hoist rope rigging 56, and pair of dump chains 58, which are interconnected to form a dragline. The disclosed end chain link is well suited for connecting chains to various rigging components as, for example, connecting dump chains to drag chains, drag chains to the bucket, upper and lower hoist chains to the spreader bar, and upper hoist chains to the hoist rope rigging.

Figure 13:
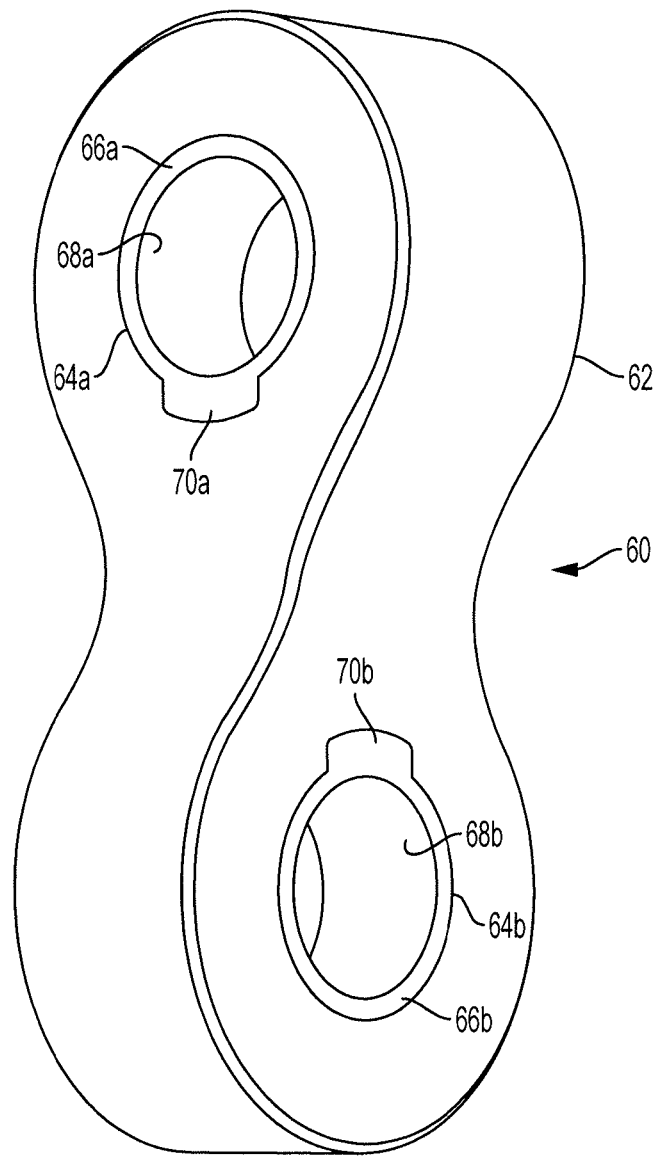
FIG. 13 is a perspective view of a third embodiment including a swivel link.

FIG. 13 is a perspective view of a third embodiment comprising a swivel link 60 having a main body 62, a pair of openings or mating surfaces 64a, 64b at opposite ends of the main body, each having respective slots as described above, and pair of swivel balls 66a, 66b seated in respective openings 64a, 64b. The swivel balls 66a, 66b have respective pin holes 68a, 68b and tabs 70a, 70b as described above. The pin holes receive respective pins or cross-members for coupling the swivel link to other rigging components.

The swivel balls 66a, 66b and mating surfaces 64a, 64b having mating truncated substantially spherical geometries to allow the pivoting movement discussed above to accommodate off-axis loads. The tabs and slots likewise have similar mating truncated substantially spherical surfaces as described above to permit select pivoting movement of the main body and each swivel ball relative to one another, while preventing relative translation movement therebetween as well as rotation or spinning movement of the swivel balls within the openings.

Unlike main body 20, 20a, the main body 62 has enlarged ends and a tapered waist. Also, the main body 62 seats two swivel balls in openings that are perpendicular to one another.

In using the terms "end link" and "stud end link" herein, such terms are intended to encompass swivel links as shown in FIG. 13, hoist links, sockets and like components.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:
1. An end link for use in heavy equipment, comprising:
a main body having first and second pass-through openings;
the main body having a longitudinal center axis substantially bisecting the first and second openings and a lateral axis perpendicular to the longitudinal center axis which substantially bisects the first opening, such that the longitudinal center axis and lateral axis define a main body plane co-planer with the main body, the first opening having a slot at one end; and
a swivel ball seated within the first opening, the swivel ball having a substantially cylindrical bore and a truncated substantially spherical outer surface, the first opening defining a truncated substantially spherical inner surface in mating engagement with the outer surface to allow the main body and swivel ball to pivot relative to one another.

2. The end link of claim 1 wherein the swivel ball is free to pivot about the lateral axis within a range of 0 to about 3 degrees out of alignment with the main body.

3. The end link of claim 1 wherein the swivel ball has a thickness and the slot has a width dimension greater than the thickness, such that the swivel ball may be oriented perpendicularly to the first opening and inserted into the first opening and slot.

4. The end link of claim 2 wherein the swivel ball has a thickness and the slot has a width dimension greater than the thickness, such that the swivel ball may be oriented perpendicularly to the first opening and inserted into the first opening end slot.

5. The end link of claim 1 wherein the swivel ball includes a tab at one end.

6. The end link of claim 5 wherein the tab is located in the slot and prevents the swivel ball from rotating in the plane of the main body about an axis perpendicular to the main body plane.

7. The end link of claim 5 wherein the tab is asymmetric relative to the plane of the main body.

8. An end link for use in heavy equipment, comprising:
a main body having first and second pass-through openings and defining a main body plane, the first pass-through opening having a slot located proximate to a central region of the main body and a truncated substantially spherical inner surface; and
a swivel ball bushing seated within the first opening, the swivel ball bushing having a truncated substantially spherical outer surface in nesting engagement with the inner surface and a tab at one end which is seated in the slot.

9. The end link of claim 8 wherein the first opening has a longitudinal center axis substantially bisecting the first opening and main body, a lateral axis perpendicular thereto which substantially bisects the first opening, and a perpendicular axis perpendicular to a plane defined by the longitudinal center axis and lateral axis.

10. The end link of claim 9 wherein the swivel ball is free to pivot about the lateral axis through a range of 0 to about 3 degrees out of alignment with the main body.

11. The end link of claim 8 wherein the swivel ball has a thickness and the slot has a width dimension greater than the thickness, such that the swivel ball may be oriented perpendicularly to the first opening and inserted into the first opening and slot.

12. The end link of claim 9 wherein the tab and slot cooperate to prevent the swivel ball bushing from rotating about the perpendicular axis.

13. The end link of claim 8 wherein the swivel ball bushing has a first wall thickness away from the tab and a second wall thickness proximate to the tab, the first wall thickness being greater than the second wall thickness.

14. The end link of claim 13 wherein the wall thickness of the swivel ball bushing tapers as the outer surface transitions from the first wall thickness to the second wall thickness.

15. The end link of claim 8 wherein the swivel ball bushing is substantially symmetric relative to the longitudinal center axis and asymmetric relative to the lateral axis.

16. The end link of claim 9 wherein the slot and tab are substantially symmetric relative to the longitudinal axis and asymmetric relative to the lateral axis.

17. The end link of claim 16 wherein the slot and tab each have mating truncated substantially spherical surfaces to allow relative pivoting movement therebetween about both the longitudinal center axis and lateral axis but not the perpendicular axis.

18. The end link of claim 9 wherein the swivel ball bushing and main body are free to pivot relative to one another through a range of 0 to about 3 degrees about the lateral axis and 0 to at least 90 degrees about the longitudinal axis.

19. An end link for use in heavy equipment, comprising:
an elongated main body having first and second pass-through openings, a channel formed at one end of the first pass-through opening, the first pass-through opening having an inner surface; and
a swivel ball bushing having an inner wall surface suitable to receive a cross member, outer surface and a tab at one end for seating in the channel, the inner wall surface and outer surface being complementary to seat the swivel ball bushing in the first pass-through opening while permitting relative pivoting movement between the swivel ball bushing and main body about longitudinal and lateral axes.

20. A method of forming an end link for use in heavy equipment, comprising the steps of:
providing an end link body having first and second pass-through openings;
providing a slot in one end of the first pass-through opening;
providing the first pass-through opening with a truncated substantially spherical inner surface;
providing a bushing having a truncated substantially spherical outer surface and a tab at one end;
orienting the bushing sideways relative to the end link body;
inserting the bushing into the first pass-through opening such that the tab is located in the slot; and
rotating the bushing about 90 degrees to seat the bushing in the first pass-through opening with the tab seated in the slot.

* * * * *